United States Patent
Olofinboba et al.

(10) Patent No.: US 9,296,490 B2
(45) Date of Patent: Mar. 29, 2016

(54) AIRCRAFT OPERATING AND POSITION INFORMATION DISPLAY SYSTEM AND METHOD

(71) Applicant: HONEYWELL INTERNATIONAL INC., Morristown, NJ (US)

(72) Inventors: Olukayode Olofinboba, Eden Prairie, MN (US); Joseph Nutaro, Phoenix, AZ (US); David Pepitone, Sun City West, AZ (US); Patrick Jackson, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 11 days.

(21) Appl. No.: 14/467,275

(22) Filed: Aug. 25, 2014

(65) Prior Publication Data

US 2016/0052641 A1    Feb. 25, 2016

(51) Int. Cl.
*G01C 21/00* (2006.01)
*B64D 45/00* (2006.01)

(52) U.S. Cl.
CPC ..................... *B64D 45/00* (2013.01)

(58) Field of Classification Search
CPC ......... B60D 45/00; G08G 5/065; G01C 23/00
USPC .............. 340/978, 945, 947, 967, 991, 995.1; 701/10, 17, 301, 408
See application file for complete search history.

(56) References Cited

U.S. PATENT DOCUMENTS

| | | | |
|---|---|---|---|
| 6,571,166 B1 | 5/2003 | Johnson et al. | |
| 6,694,249 B1* | 2/2004 | Anderson | G01C 23/00 340/947 |
| 7,109,889 B2 | 9/2006 | He | |
| 8,188,887 B2 | 5/2012 | Catten et al. | |
| 8,396,616 B1 | 3/2013 | Barber et al. | |
| 8,478,460 B2 | 7/2013 | Hugues | |

(Continued)

FOREIGN PATENT DOCUMENTS

| | | |
|---|---|---|
| EP | 1598720 A1 | 11/2005 |
| EP | 2073186 A2 | 6/2009 |
| EP | 2565861 A2 | 3/2013 |

(Continued)

OTHER PUBLICATIONS

Audi Mediaservices, Press Release—The Audi TT offroad concept show car, Apr. 19, 2014.
European Search Report issued on Feb. 12, 2016 for European Application No. 15181306.0.

*Primary Examiner* — Tai T Nguyen
(74) *Attorney, Agent, or Firm* — Shimokaji IP

(57) ABSTRACT

A method of displaying aircraft operating and position information with an electronic display unit comprises determining a position of a first aircraft at an airport; determining an optimum speed range of the first aircraft; determining a first aircraft speed of the first aircraft; displaying on a screen of the display unit a map of at least part of the airport; displaying a first aircraft symbol on the map, the first aircraft symbol displayed in a position on the map indicative of position of the first aircraft; and displaying an optimum speed range symbol having a lower bound end and a higher bound end in a position on the map such that the first aircraft symbol is between the lower bound end and the higher bound end when the first aircraft speed is within the optimum speed range.

20 Claims, 10 Drawing Sheets

(56) References Cited

U.S. PATENT DOCUMENTS

2003/0137444 A1* 7/2003 Stone .................. G08G 5/0008
342/30
2010/0114406 A1 5/2010 DeJonge

FOREIGN PATENT DOCUMENTS

| EP | 2568256 A2 | 3/2013 |
| EP | 2660676 A1 | 11/2013 |

* cited by examiner

AIRCRAFT OPERATING AND POSITION INFORMATION DISPLAY SYSTEM AND METHOD

BACKGROUND OF THE INVENTION

The present invention generally relates to systems and methods for displaying operating and position information for an aircraft.

Some aircraft may now be equipped with an electric drive taxi system (ETS), which may move the aircraft on the ground using electric drive motors on the main taxi gear, powered by an auxiliary power unit (APU), rather than using thrust from the main engines. The ETS may have the potential to allow a pilot to move an aircraft around an airport taxi surface area in a manner that provides substantial fuel savings. However, to provide fuel savings, the pilot may have to operate the ETS in an unfamiliar manner, different from using engine thrust to move the aircraft on the ground.

Taxiing with thrust power from the main engines, may provide excess power at idle, which may allow the pilot to achieve any desired taxi speed, regardless of aircraft weight or airport surface condition. With the APU powered ETS, however, the power available may be more limited, so taxi performance may be variable based on the mechanical design of the ETS system, power available from the APU, taxiway slope, aircraft weight, tires and tire pressure, and other factors. This may present the pilot with a different operational capability than what he/she may be used to when using main engine thrust power to taxi. Using the ETS safely, and in a manner that maximizes operational efficiency (for example, to provide maximum fuel efficiency and minimal brake and APU wear) may be especially difficult for pilots who are newly operating an aircraft with the ETS.

Some ETS systems may be equipped with an automatic speed control which may assist pilots in operating the ETS system efficiently. However, even when the ETS is being controlled automatically, the pilot may want to monitor the operation of the ETS system.

As can be seen, there may be an ongoing need for systems and methods for displaying operating and position information for an aircraft with the ETS to assist pilots in achieving operational efficiencies and/or to monitor the ETS when an automatic speed control is being utilized.

SUMMARY OF THE INVENTION

In one aspect of the present invention, a method of displaying aircraft operating and position information with an electronic display unit comprises determining a position of a first aircraft at an airport; determining an optimum speed range of the first aircraft, with a performance model; determining a first aircraft speed of the first aircraft with a speed sensor; displaying on a screen of the display unit a map of at least part of the airport, including runways and taxiways, from map data in an airport database; displaying a first aircraft symbol on the map, the first aircraft symbol displayed in a position on the map indicative of position of the first aircraft; and displaying an optimum speed range symbol, the optimum speed range symbol having a lower bound end and a higher bound end, on the map; and wherein the optimum speed range symbol is displayed in a position on the map such that the first aircraft symbol is between the lower bound end and the higher bound end when the first aircraft speed is within the optimum speed range.

In another aspect of the present invention, an aircraft operating and position information display system comprises an aircraft speed sensor configured to generate a first aircraft speed signal indicative of the speed of a first aircraft; a GPS system configured to generate a first aircraft position signal indicative of a geographic position of the first aircraft; a controller including an aircraft performance model configured to predict an optimum speed range for the first aircraft; and an airport database including map data on at least one airport, the map data including geographic locations and dimensions of runways and taxiways; and wherein the controller is configured to generate display signals as a function of the first aircraft speed signal, the first aircraft position signal, the optimum taxi speed range, and the map data; and a first display unit configured to display as a function of the display signals; a map of at least part of the airport, including runways and taxiways, from map data in an airport database; a first aircraft symbol on the map, the first aircraft symbol displayed in a position on the map indicative of position of the first aircraft; and an optimum speed range symbol, the optimum speed range symbol having a lower bound end and a higher bound end, on the map; and wherein the optimum speed range symbol is displayed in a position on the map such that the first aircraft symbol is between the lower bound end and the higher bound end when the first aircraft speed is within the optimum speed range.

In yet another aspect of the present invention, a display unit comprises a screen in the flight deck of a first aircraft configured to receive display signals including a first aircraft position signal indicative of a position of the first aircraft, a first aircraft speed signal indicative of a speed of the first aircraft, airport map data including geographic locations and dimensions of runways and taxiways for an airport, and an optimum speed range signal indicative of an optimum speed range of the first aircraft; and display on the screen, as a function of the display signals, a map of at least part of the airport, including runways and taxiways, from map data in an airport database; a first aircraft symbol on the map, the first aircraft symbol displayed in a position on the map indicative of position of the first aircraft; and an optimum speed range symbol, the optimum speed range symbol having a lower bound end and a higher bound end, on the map; and wherein the optimum speed range symbol is displayed in a position on the map such that the first aircraft symbol is between the lower bound end and the higher bound end when the first aircraft speed is within the optimum speed range These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides a system and method for displaying operating and position information for an aircraft. Generally, an aircraft equipped with an ETS powered by an APU for ground travel may operate and respond differently than an aircraft with a taxi system powered by thrust from the main engines. Pilots, especially those who have little experience operating an aircraft with ETS, may find it difficult to operate the aircraft in a manner which provides optimum benefit including, for example, maximum fuel efficiency and minimum brake wear. A system and method that displays operating and position information allowing the pilot to see critical information including when the aircraft is operating in an optimum speed range may assist the pilot in operating the aircraft to achieve optimum benefits.

Figure 1:
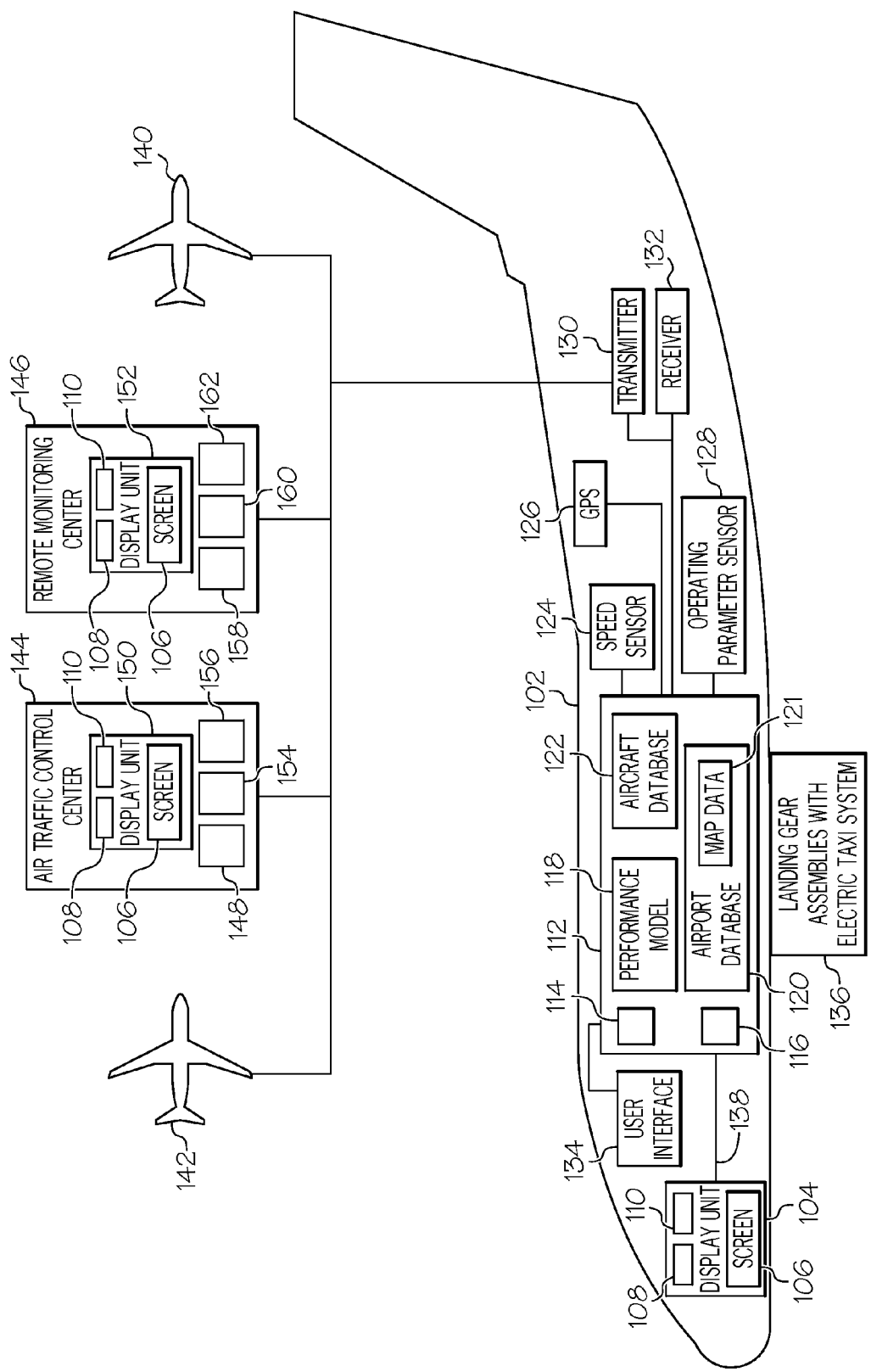
FIG. 1 is a schematic diagram of a system for displaying operating and position information for an aircraft according to an exemplary embodiment of the present invention.

Referring now to FIG. 1, a schematic diagram of a system 100 for displaying operating and position information for a first aircraft 102 according to an exemplary embodiment of the present invention is illustrated. The system 100 may include a speed sensor 124 configured to generate a first aircraft speed signal indicative of the speed of a ground speed the first aircraft 102 of a first aircraft 102; a GPS system 126 configured to generate a first aircraft position signal indicative of a geographic position of the first aircraft 102; a first controller 112 including an aircraft performance model 118 configured to predict a ground optimum speed range for the first aircraft 102; and an airport database 120 including map data 121 on at least one airport, the map data 121 including geographic locations and dimensions of runways and taxiways; and a first display unit 104. The first controller 112 may be configured to generate display signals as a function of the first aircraft speed signal, the first aircraft position signal, the optimum taxi speed range, and the map data. The first display unit 104 may be configured to display, as a function of the display signals, operating and position information which will be more fully described in relation to FIGS. 2-6.

The first display unit 104 may include any electronic device which may present information in visual form. The first display unit 104 may include, for example, a portable electronic device such as a laptop computer or a tablet, a portion of the head-up or primary flight displays, or any other device with a visual display which would be known in the art. The first display unit 104 may include a screen 106, an internal processor 108 and a memory device 110. The processor 108 and memory device 110 may process input signals into display signals to present the operating and position information to a viewer on the screen 106. In an alternate embodiment, the first display unit 104 may depend on a separate first controller 112 to process input signals and generate display signals which may be transmitted to the first display unit 104 to present visual information on the screen 106.

The first display unit 104 may be communicatively connected to the first controller 112 through a communication link 138. Generally, communication links 138 are illustrated in FIG. 1 as lines. Communication links 138 may include analogue links, digital links, cables, wireless links, and/or any links for electronic communication between devices which would be known in the art.

The first controller 112 may include a processor 114 and a memory component 116. The processor 114 may include microprocessors or other processors as known in the art. In some embodiments the processor 114 may include multiple processors. The first controller 112 may execute instructions and generate display signals, as described below and in relation to FIGS. 2-6, and 7A-7D.

Such instructions may be read into or incorporated into a computer readable medium, such as the memory component 116, or provided external to processor 114. The instructions may include multiple lines or divisions of code. The lines or divisions of code may not be consecutive order, and may not be located in the same section of code. In alternative embodiments, hard-wired circuitry may be used in place of or in combination with software instructions as described above, below, or in relation to the drawings.

The term "computer-readable medium" as used herein may refer to any non-transitory medium or combination of media that participates in providing instructions to the processor 114 for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Although shown as one physical unit, the first controller 112 may include multiple units, or be part of a larger controller unit, as is known in the art. The multiple units may be located on-board the first aircraft 102 or remotely.

The aircraft performance model 118 may predict the performance of the first aircraft 102 and its components in a number of different circumstances as a function of operating parameters. The first aircraft 102 may include landing gear assemblies 136 equipped with the ETS, and the performance model 118 may be configured to predict, for example, the optimum speed range, based on priorities such as maximum fuel efficiency and minimal brake wear, and monitored operating parameters. The priorities may be pre-programmed into the performance model 118 or may be entered through a user interface 134. The operating parameters may be provided by operating parameter sensors 128. The performance model 118 may also be configured to predict the acceleration and deceleration performance of the first aircraft 102 based, at least in part, the operating parameters of the ETS, the weight and balance of the first aircraft 102, and environmental factors such as the slope of a runway. The performance model 118 may also predict the time it will take the first aircraft 102 to cross a runway or intersection a specified distance away, and predict where the first aircraft 102 will stop if put into a coast mode, or where the first aircraft 102 will stop if full regenerative and other braking power is applied.

Additionally, the performance model 118 may predict the position of the first aircraft 102 after a predetermined time period, for example ten (10) seconds, if the first aircraft 102 maintains its present speed, or applies full acceleration power. In one non-limiting example, the performance model 118 may obtain operating parameters on which to at least partly base predictions from one or more operating parameter sensors 128. Non-limiting examples of operating parameter sensors may include motor current, motor voltage, main gear load, fuel rate, and engine speed sensors.

The performance model 118 may include any aircraft performance model which may predict the performance of the first aircraft 102 needed to implement the methods described in relation to FIGS. 2-6, and 7A-7D. In one non-limiting example, the performance model 118 may include performance models described and disclosed in co-pending U.S. patent application Ser. No. 14/258,798, entitled "E-Taxi Predictive Performance System", and filed with the United States Patent and Trademark Office on Apr. 22, 2014; the content of which is hereby incorporated by reference.

The airport database 120 may include any database which contains information on one or more airports in which the first aircraft 102 operates in. The airport database 120 may contain map data 121 which may include airport geometries including the locations and dimensions of runways and taxiways, buildings and other spaces at the one or more airports. A non-limiting example of the airport database 120 includes the airport database in the Primus Epic® Interactive Navigation (INAV) avionics system available from Honeywell and Jeppesen. Other suitable databases for alternative embodiments may be commercially available and may include any airport database 120 containing the map information to implement the methods described below in relation to FIGS. 2-6, and 7A-7D.

The first controller 112 may also include an aircraft database 122 which may include the wingtip and other dimensions of multiple types and models of aircrafts.

The aircraft speed sensor 124 may be any type of speed sensor known in the art operable to generate a first aircraft speed signal indicative of the speed of the first aircraft 102. The speed sensor 124 may include, for example, a software sensor which determines the speed of the first aircraft 102 as a function of current and voltage of taxi electric motors and aircraft weight; tachometer type sensors on one or more taxi wheels; and/or a software speed determination function of the GPS system 126. The speed sensor 124 may be communicatively connected to the first controller 112.

The GPS system 126 may include any type of GPS system known in the art operable to generate a first aircraft position system indicative of a geographic position of the first aircraft 102. The GPS system 126 may be communicatively connected to the first controller 112.

The system 100 may also include the user interface 134, a first transmitter 130, and a first receiver 132. The user interface 134 may include any device which allows a user to enter information which may then be transmitted to the first controller 112. The first controller 112 may be communicatively connected to multiple aircrafts including a second aircraft 140 and a third aircraft 142 on the ground at the same airport as the first aircraft 102, an air traffic control center 144, and a remote monitoring center 146 through the first transmitter 130 and the first receiver 132.

The user interface 134 may include, for example, a keyboard, an interactive touch screen, buttons, voice recognition systems, a laptop computer, a portable tablet, a phone, or any other device known in the art which would allow a user to enter information. The user interface 134 may be located on the flight deck of the first aircraft 102. The user interface 134 may allow the user to enter an intended route at an airport, current weather conditions, or any other information to implement methods described below in relation to FIGS. 2-6, and 7A-7D.

The first transmitter 130 may include any equipment operable to generate signals carrying data from the first aircraft 102. The data may be transmitted, for example, to other aircraft such as the second aircraft 140 and the third aircraft 142, and/or remote centers such as the air traffic control center 144 and the remote monitoring center 146. The remote monitoring center 146 may, for example, be run by an airline or an aircraft or aircraft component manufacturer.

The first receiver 132 may include any electronic device that converts signals into usable data. The data may be received, for example, from other aircraft such as the second aircraft 140 and the third aircraft 142, and/or remote centers such as the air traffic control center 144 and the remote monitoring center 146.

The first transmitter 130 may transmit data, and the first receiver 132 receive data according to any communication protocol known in the art. For example, the first transmitter 130 may transmit data, and the first receiver 132 receive data, to and from the second aircraft 140, the third aircraft 142, and the remote centers according to communication protocols of the automatic dependent surveillance-broadcast (ADS-B) system, transmit and receive voice signals at a predetermined frequency band to and from the air traffic control center 144, and/or transmit and receive data signals with security embedded into them to and from the remote monitoring center 146.

The first transmitter 130 may transmit the same or similar display signals received by the first display unit 104 from the first controller 112, to a second display unit 150 which may be located at the air traffic control center 144, and/or a third display unit 152 which may be located at the remote monitoring center 146.

The first receiver 132 may receive data from the second aircraft 140 including the second aircraft position, second aircraft model, second aircraft type, and second aircraft intended route. In some embodiments the first receiver 132 may receive data from the second aircraft 140 including dimensions of the second aircraft 140, for instance the wingtip dimensions of the second aircraft 140.

The first receiver 132 may receive data from the third aircraft 142 including the third aircraft position, third aircraft model, third aircraft type, and third aircraft intended route. In some embodiments the first receiver 132 may receive data from the third aircraft 142 including dimensions of the third aircraft 142, for instance the wingtip dimensions of the third aircraft 142.

The air traffic control center 144 may include the second display unit 150, a second controller 148, a second transmitter 154, and a second receiver 156. In some embodiments the air traffic control center 144 (or other remote monitoring center) may include more than one second display unit 150, second controller 148, second transmitter 154, and second receiver 156, such that multiple display units may receive the display signals. The second display unit 150 may be similar to the first display unit 104 in operation and will not be described further.

The second controller 148 may process the display signals received from the first aircraft 102 to send to the second display unit 150. The second transmitter 154 may send, and the second receiver 156 may receive signals from the first aircraft 102. The second display unit 150 may display on the screen 106 the displays shown and described in relation to FIGS. 2-6, and 7A-7D at all times, or only when predefined operating conditions of the first aircraft 102, such as operation at a speed greater than the optimum speed range, or operation with a danger of collision with the second aircraft 140 or the third aircraft 142 occur.

The remote monitoring center 146 may include the third display unit 152, a third controller 158, a third transmitter 160, and a third receiver 162. The third display unit 152 may be similar to the first display unit 104 in operation and will not be described further. The third controller 158 may process the display signals received from the first aircraft 102 to send to the third display unit 152. The third transmitter 160 may send, and the third receiver 162 may receive signals from the first aircraft 102. The third display unit 152 may display on the screen 106 the displays shown and described in relation to FIGS. 2-6, and 7A-7D at all times, or only when predefined operating conditions of the first aircraft 102, such as operation at a speed greater than the optimum speed range, or operation with a danger of collision with the second aircraft 140 or the third aircraft 142 occur.

Referring now to FIGS. 2-6, six different embodiments of a display 200 of operating and position information for the first aircraft 102 according to exemplary embodiments of the present invention are illustrated. The screen 106 of the first display unit 104, the second display unit 150, and/or the third display unit 152 may show any of the six embodiments of the display 200, in conjunction with a method of displaying aircraft operating and position information as will be explained in more detail in relation to FIGS. 7A-7D. The exemplary displays may correspond to different operating conditions that the first aircraft 102 may experience.

Figure 2:
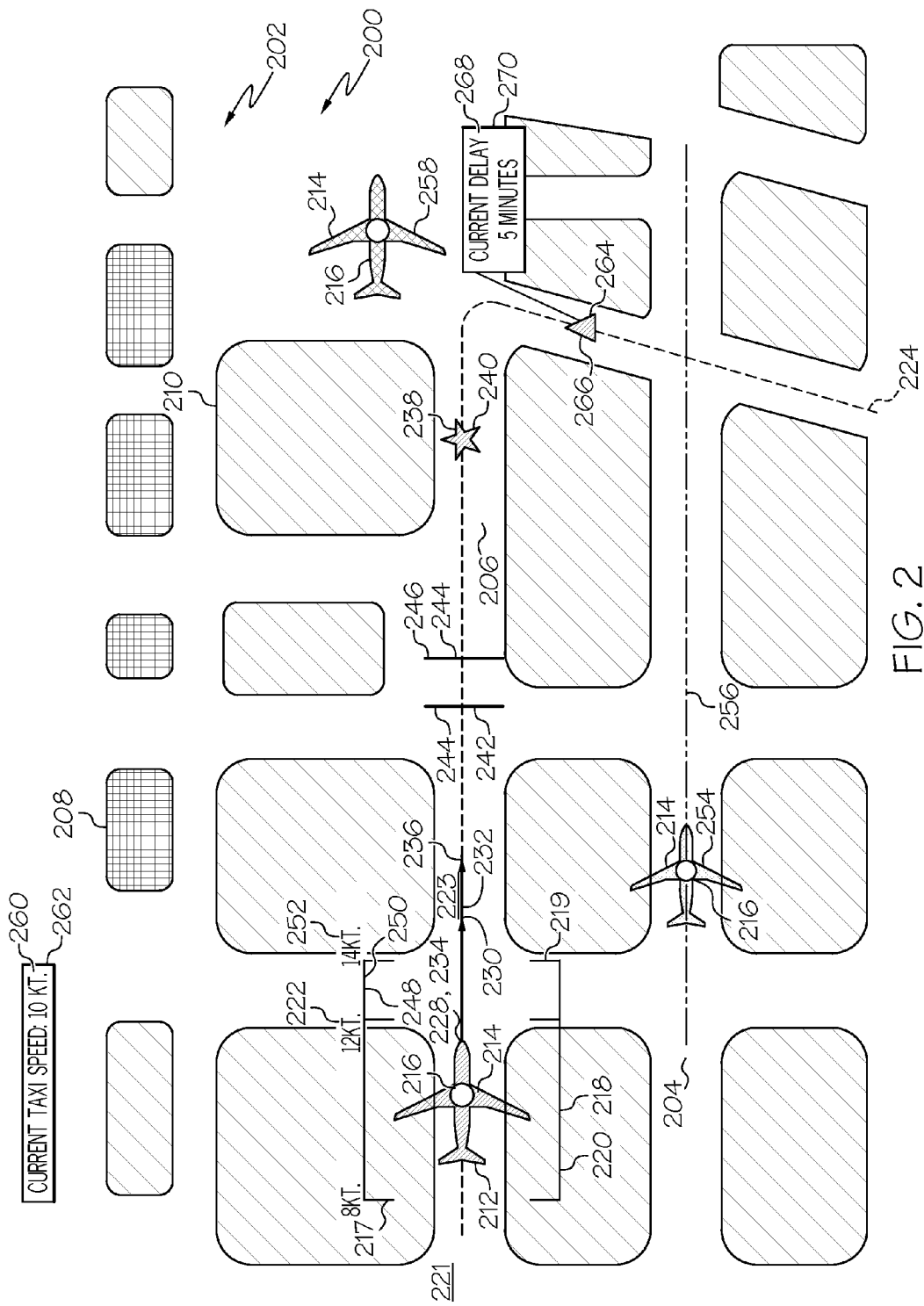
FIG. 2 is a first embodiment of a display of operating and position information for an aircraft according to an exemplary embodiment of the present invention.

Referring now to FIG. 2, a first embodiment of display 200 of operating and position information for the first aircraft 102 according to an exemplary embodiment of the present invention is illustrated. The display 200 may correspond to operating conditions of the first aircraft 102 in which the first aircraft 102 is operating within an optimal speed range.

The display 200 includes at least part of a map 202 of an airport. The map 202 may be of a part of the airport which may be of interest to a pilot or others monitoring the movement of the first aircraft 102. The map 202 may include runways 204, taxiways 206, terminals 208, and buildings or spaces 210. In the illustrated display 200, the runways 204 and taxiways 206 are illustrated in white, the terminals 208 are illustrated with a crossed line pattern, and the buildings or spaces 210 are illustrated with a diagonal line pattern. In other alternative embodiments, the map 202 may be in color and the runways 204, taxiways 206, terminals 208, and buildings or spaces 210 may be illustrated in different colors instead of patterns. For example, the runways 204 may be black, the taxiways 206 may be grey, the terminals 208 and buildings and spaces 210 may be green. The colors and patterns of the different components of the map 202 may be as one skilled in the art would know or choose. The map 202 may be scaled to represent the dimensions of the portion of the airport shown.

The display 200 may include a first aircraft symbol 212. The first aircraft symbol 212 may include a plane icon 214 which is scaled to represent the dimensions of the first aircraft 102 in relation to the map 202. The first aircraft symbol 212 may include a reference point 216 which may correspond to a position reference point on the first aircraft 102. The first aircraft symbol 212 may be placed on the map such that the reference point 216 is in a position on the map 202 corresponding to the actual position of the reference point on the first aircraft 102. The first aircraft symbol 212 may be solid black as in the illustrated embodiment, may be another color or pattern, and/or may change colors or patterns depending on the position and operating conditions of the first aircraft 102.

The display 200 may include an optimum speed range symbol 218 which is representative of an optimum speed range for the first aircraft 102. The optimum speed range symbol 218 may include a lower bound end 217 and a higher bound end 219. In the embodiment illustrated, the optimum speed range symbol 218 may include a bracket set 220. The optimum speed range symbol 218 may be placed on the map 202 in a visual relationship with the first aircraft symbol 212 that depicts the relationship between the current speed of the first aircraft 102 and an optimum speed range that the first aircraft 102 may operate in and maintain optimum operation. When the first aircraft 102 is operating in the optimum speed range the optimum speed range symbol 218 may be displayed in a position on the map 202 such that the first aircraft symbol 212 is between the lower bound end 217 and the higher bound end 219. The bracket set 220 may include black lines of a first thickness, as shown in the exemplary embodiment, or may include other colors or other thicknesses in alternative embodiments. The optimum speed range symbol 218 may include other types of symbols in place of the bracket set 220. The display 200 may also include optimum speed range text 222 which may be a textual representation of the optimum speed range of the first aircraft 102.

The optimum speed range symbol 218 may include a lower bound side 221 and a higher bound side 223. When the first aircraft 102 is operating at a speed less than the optimum speed range, the optimum speed range symbol may be displayed on the map 202 in a position such that the first aircraft symbol 212 is on the lower bound side 221 (shown in relation to FIG. 3). When the first aircraft 102 is operating at a speed greater than the optimum speed range, the optimum speed range symbol may be displayed on the map 202 in a position such that the first aircraft symbol 212 is on the higher bound side 223 (shown in relation to FIGS. 4-6). The relative positions of the first aircraft symbol 212 and the optimum speed range symbol 218 on the map 202 may allow the pilot or persons monitoring the first aircraft 102 to immediately see if the first aircraft 102 is operating at a speed in the optimum speed range.

The display 200 may include a first intended route 224 which may display an approved route for the first aircraft 102 on the map 202. The first intended route 224 may be a dashed black line as shown in the exemplary embodiment, or may include other colors or type lines.

The display 200 may include a speed vector symbol 226 including a first end 228 and a second end 230. The speed vector symbol 226 may be placed on the map 202 along the first intended route 224 with the first end 228 at a position corresponding with the position of the first aircraft 102, and the second end 230 at a position corresponding with a predicted position of the first aircraft 102 at the end of a predetermined time period, if the first aircraft 102 maintains the current speed. The predetermined time period may be, for example, 10 seconds, or any other time period which would be known by one skilled in the art. The speed vector symbol 226 may include a bold black line with a particular type arrow head, as illustrated in the exemplary embodiment, or any other color or type line and type arrowhead, or other symbol which would be known in the art. The color and/or type line may contrast with the first intended route 224 to ensure the speed vector symbol 226 and the first intended route 224 are easily distinguishable by a viewer.

The display 200 may include a maximum speed vector symbol 232 including a first end 234 and a second end 236. The maximum speed vector symbol 232 may be placed on the map 202 along the first intended route 224 with the first end 234 at a position corresponding with the position of the first aircraft 102, and the second end 236 at a position corresponding with a predicted position of the first aircraft 102 at the end of the predetermined time period, if the first aircraft 102 utilizes maximum acceleration. The maximum speed vector symbol 232 may include a bold black line with a type arrow head different than the speed vector symbol 226, as illustrated in the exemplary embodiment, or any other color or type line and type arrowhead, or other symbol which would be known in the art. The color and/or type line may contrast with the first intended route 224 to make the maximum speed vector symbol 232 and the first intended route 224 easily distinguishable by a viewer.

The display 200 may include a deceleration point symbol 238 in a position on the map 202 corresponding to a predicted deceleration point position along the first intended route 224 where the first aircraft 102 may have to begin deceleration to continue to follow the first intended route 224. The deceleration point position may for example be a position where the first aircraft 102 must begin deceleration to be able to make a turn along the first intended route 224 safely. In another embodiment the deceleration point position may be a position where the first aircraft 102 must begin deceleration to safely come to a stop at a holding position. The deceleration point symbol 238 may include a black star icon 240 as shown in the illustrated embodiment, or may include other shaped icons, a line, or other colored icons or lines.

The display may include an emergency stop symbol 242 on the map 202 corresponding to an emergency stop position along the first intended route 224 where the first aircraft 102 would come to a stop if full braking power was applied to the first aircraft 102 until the first aircraft 102 came to a stop. The emergency stop symbol 242 may include a black solid line 244 at a distinguishable angle to the first intended route 224, or may include other shaped and type icons or line in other colors.

The display 200 may include a coast stop symbol 246 on the map 202 corresponding to a coast stop position along the first intended route 224 where the first aircraft 102 would come to a stop if the first aircraft 102 was put in a coast mode until the first aircraft 102 came to a stop. The coast stop symbol 246 may include a black solid line 244 at a distinguishable angle to the first intended route 224, or may include other shaped and type icons or line in other colors.

The display 200 may include a maximum speed symbol 248 which is representative of the maximum speed the first aircraft 102 may be capable of in the current operating conditions. The maximum speed symbol 248 may include a bracket extension 250. The maximum speed symbol 248 may be placed on the map 202 in a visual relationship with the first aircraft symbol 212 and the optimum speed range symbol 218 that depicts the relationship between the current speed of the first aircraft 102, the optimum speed range that the first aircraft 102 may operate, and the maximum speed the first aircraft 102 may be capable of. The bracket extension 250 may include black lines of a first thickness, as shown in the exemplary embodiment, or may include other colors or other thicknesses in alternative embodiments. The maximum speed symbol 248 may include other types of symbols in place of the bracket extension 250. The display 200 may also include maximum speed text 252 which may be a textual representation of the maximum speed of the first aircraft 102.

The display 200 may include a second aircraft symbol 254. The second aircraft symbol 254 may include a plane icon 214 which is scaled to represent the dimensions of the second aircraft 140 in relation to the map 202. The second aircraft symbol 254 may include a reference point 216 which may correspond to a position reference point on the second aircraft 140. The second aircraft symbol 254 may be placed on the map such that the reference point 216 is in a position on the map 202 corresponding to the actual position of the reference point on the second aircraft 140. The second aircraft symbol 254 may be a black and white dotted pattern as shown in the illustrated embodiment, or may be another color or pattern. The color, pattern, and/or type icon used for the second aircraft symbol 254 may make the second aircraft symbol 254 easily distinguishable from the first aircraft symbol 212 by a viewer.

The display 200 may include a second intended route 256 which may display an approved route for the second aircraft 140 on the map 202. The second intended route 256 may be a dashed and two dotted black line as shown in the exemplary embodiment, or may include other colors or type lines. The colors or type lines of the second intended route 156 may contrast with the first intended route 224, the speed vector symbol 226, and the maximum speed vector symbol 232 such that a viewer may easily distinguish one symbol from another.

The display 200 may include a third aircraft symbol 258. The third aircraft symbol 258 may include a plane icon 214 which is scaled to represent the dimensions of the third aircraft 142 in relation to the map 202. The third aircraft symbol 258 may include a reference point 216 which may correspond to a position reference point on the third aircraft 142. The third aircraft symbol 258 may be placed on the map such that the reference point 216 is in a position on the map 202 corresponding to the actual position of the reference point on the third aircraft 142. The third aircraft symbol 258 may be a black and white checkered pattern as shown in the illustrated embodiment, or may be another color or pattern. The color, pattern, and/or type icon used for the third aircraft symbol 258 may make the third aircraft symbol 258 easily distinguishable from the first aircraft symbol 212 and the second aircraft symbol 254 by a viewer.

The display 200 may include a textual first aircraft speed 260 including a textual representation of the current speed of the first aircraft 102. The textual first aircraft speed 260 may be positioned in a speed text area 262. The textual first aircraft speed 260 may be black as shown in the illustrated embodiment, or the textual first aircraft speed 260 may be another color, such as blue. The textual first aircraft speed 260 may change colors depending on the speed of the first aircraft 102. The speed text area 262 may be positioned in the upper left hand corner of the display 200, and be white as shown in the illustrated embodiment, or the speed text area 262 may be positioned other places on the display, and be other colors such as black. The speed text area 262 may change colors depending on the speed of the first aircraft 102.

The display 200 may include a delay point symbol 264 in a position on the map 202 corresponding to a delay position on the first intended route 224 where the first aircraft 102 may be required to stop and wait for a predicted delay time period. For example, if other aircraft are predicted to land on a particular runway 204, the first aircraft 102 may be required to stop at a delay stop position before crossing the runway 204 and wait until it is safe to continue. The delay point symbol 264 may include a black triangular icon 266 as shown in the illustrated embodiment, or the delay point symbol 264 may include other shaped and colored icons or lines. The color and size of the delay point symbol 264 may change depending on the distance between the first aircraft 102 and the delay point.

The display 200 may include a textual predicted delay time 268 including a textual representation of the predicted delay time period. The textual predicted delay time 268 may be positioned in a delay time text area 270. The textual predicted delay time 268 may be black as shown in the illustrated embodiment, or the textual predicted delay time 268 may be another color, such as blue. The textual predicted delay time 268 may change colors depending on the distance between the first aircraft 102 and the delay point and/or the predicted delay time period. The delay time text area 270 may be positioned near the delay point symbol 264, and be white as shown in the illustrated embodiment, or the delay time text area 270 may be positioned other places on the display, and be other colors such as black. The delay time text area 270 may change colors depending on the distance between the first aircraft 102 and the delay point and/or the predicted delay time period.

Referring now to FIGS. 3-6, a second (FIG. 3), third (FIG. 4), fourth (FIG. 5), and fifth (FIG. 6) embodiment of the display 200 of operating and position information for the first aircraft 102, according to an exemplary embodiments of the present invention, are illustrated. Elements of the second, third, fourth, and fifth embodiments of the display 200 which are similar to those of the first embodiment of the display 200, illustrated in and described in relation to FIG. 2, will not be described. Only differences and additional elements will be described. In the embodiments illustrated in FIGS. 3-6 of the display 200, a number of different symbols or icons may be included as compared to the first embodiment of the display 200. In general, any type symbol or icon which would be known by one skilled in the art may be included in the display.

Figure 3:
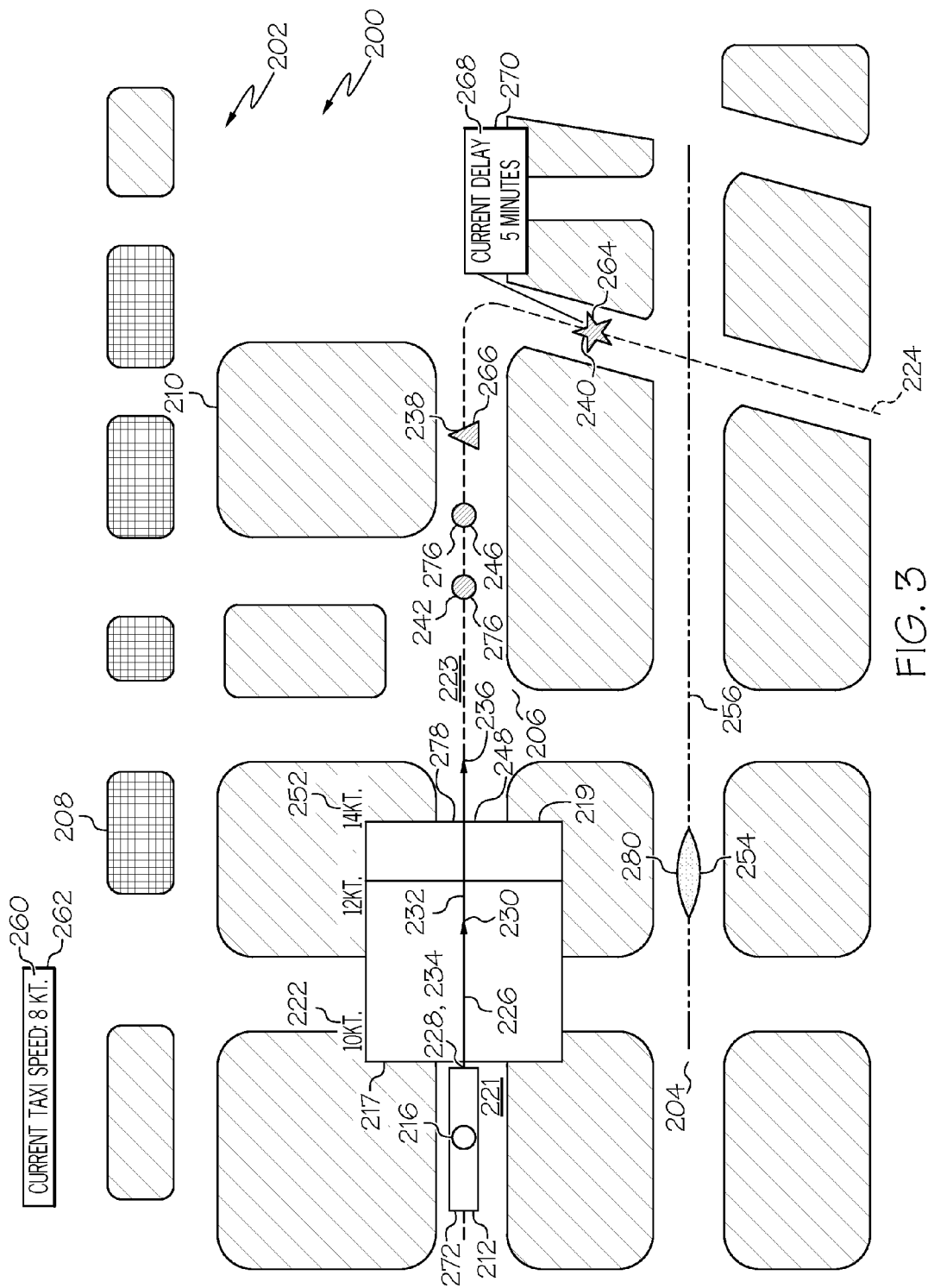
FIG. 3 is a second embodiment of the display of operating and position information for an aircraft according to an exemplary embodiment of the present invention.

Referring now to FIG. 3, the second embodiment of the display 200 may be a display on the screen 106 of one of the display units 104, 150, 152 when the first aircraft 102 is operating at a speed less than the optimum speed range. The display 200 may include the optimum speed range symbol 218 including a partially transparent white rectangle 274 with a black outline which may be positioned on the map 202 such that the first aircraft symbol 212 is on the lower bound side 221. This relative placement of the first aircraft symbol 212 and the optimum speed range symbol 218 may symbolize that the first aircraft 102 is operating at a speed less than optimum. The distance between the first aircraft symbol 212 and the optimum speed range symbol 218 may correspond to speed difference magnitude between the speed of first aircraft 102 and the optimum speed range.

In the second embodiment of the display 200; the first aircraft icon 200 may include a white rectangle with a black outline; the coast stop signal 246 may include a black circle icon 276; the emergency stop signal 242 may include a black circle icon 276; the maximum speed symbol 248 may include a white extended partially transparent rectangle 278 with a black outline; the deceleration point symbol 238 may include the triangular icon 266; the delay point symbol 264 may include the star icon 244; and the second aircraft symbol 254 may include a black and white dot patterned elliptical icon 280. Although all icons and symbols are depicted in black and white in the illustrated second embodiment of the display, other color and patterned icons and symbols may be used as would be known by one skilled in the art.

Figure 4:
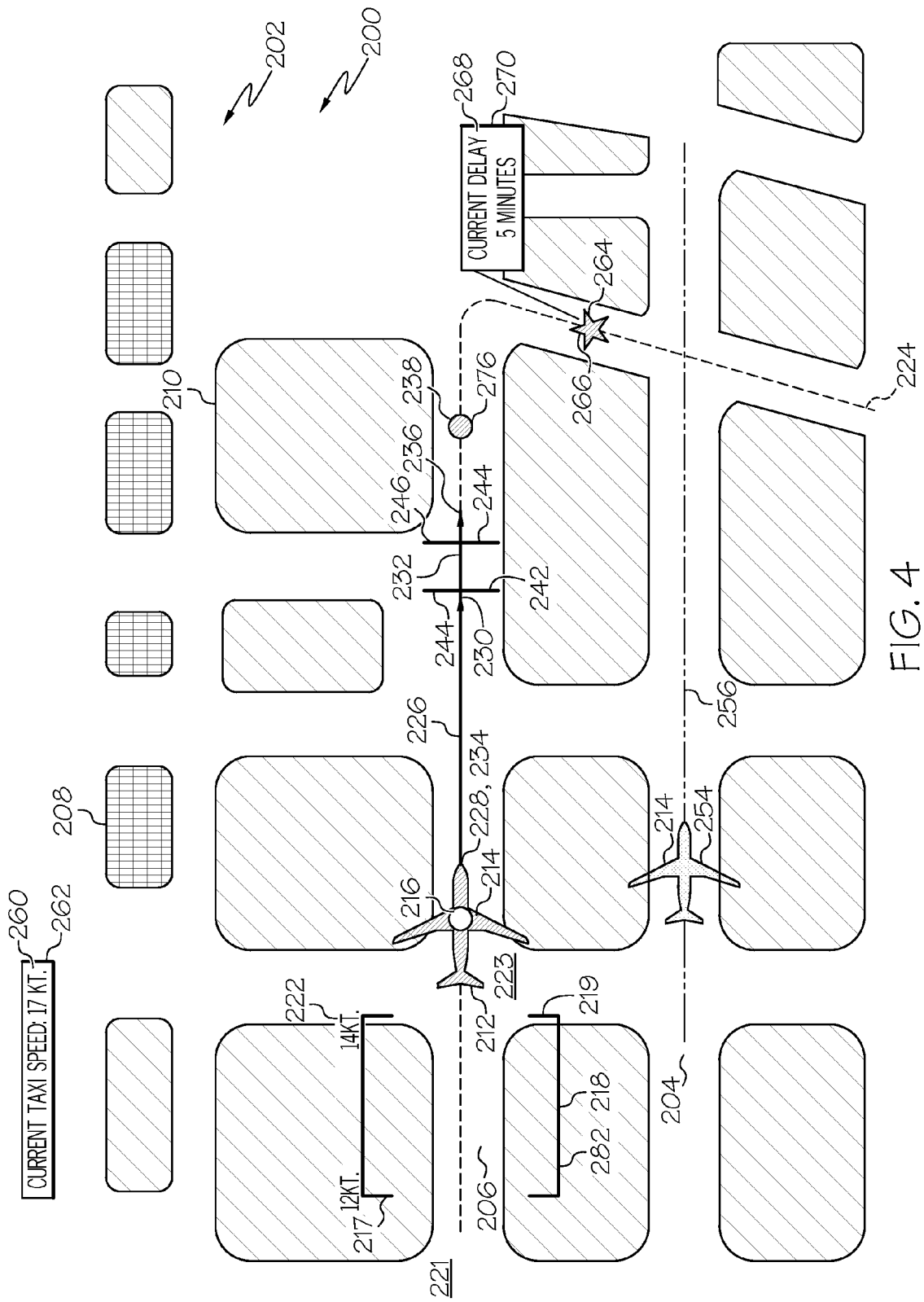
FIG. 4 is a third embodiment of the display of operating and position information for an aircraft according to an exemplary embodiment of the present invention.

Referring now to FIG. 4, the display 200 may be a display on the screen 106 of one of the display units 104, 150, 152 when the first aircraft 102 is operating at a speed greater than the optimum speed range. The display 200 may include the optimum speed range symbol 218 including a thicker bracket set 282 which may be positioned on the map 202 such that the first aircraft symbol 212 is on the higher bound side 223. This relative placement of the first aircraft symbol 212 and the optimum speed range symbol 218 may symbolize that the first aircraft 102 is operating at a speed greater than optimum. The distance between the first aircraft symbol 212 and the optimum speed range symbol 218 may correspond to speed difference magnitude between the speed of first aircraft 102 and the optimum speed range.

The thicker bracket set 282 may include lines of a second thickness, the second thickness greater than the first thickness of the bracket set 220. The thicker lines may draw a viewer's attention to the display 200 and the viewer may quickly realize that the first aircraft 102 is operating at a speed greater than the optimum speed range. In addition to the thicker bracket set 282, symbols and icons may include colors which may more draw the viewer's attention to the display 200 and to the operating conditions of the first aircraft 102.

In the third embodiment of the display 200, the deceleration point symbol 238 may include the circular icon 276; and the delay point symbol 264 may include the star icon 244.

Figure 5:
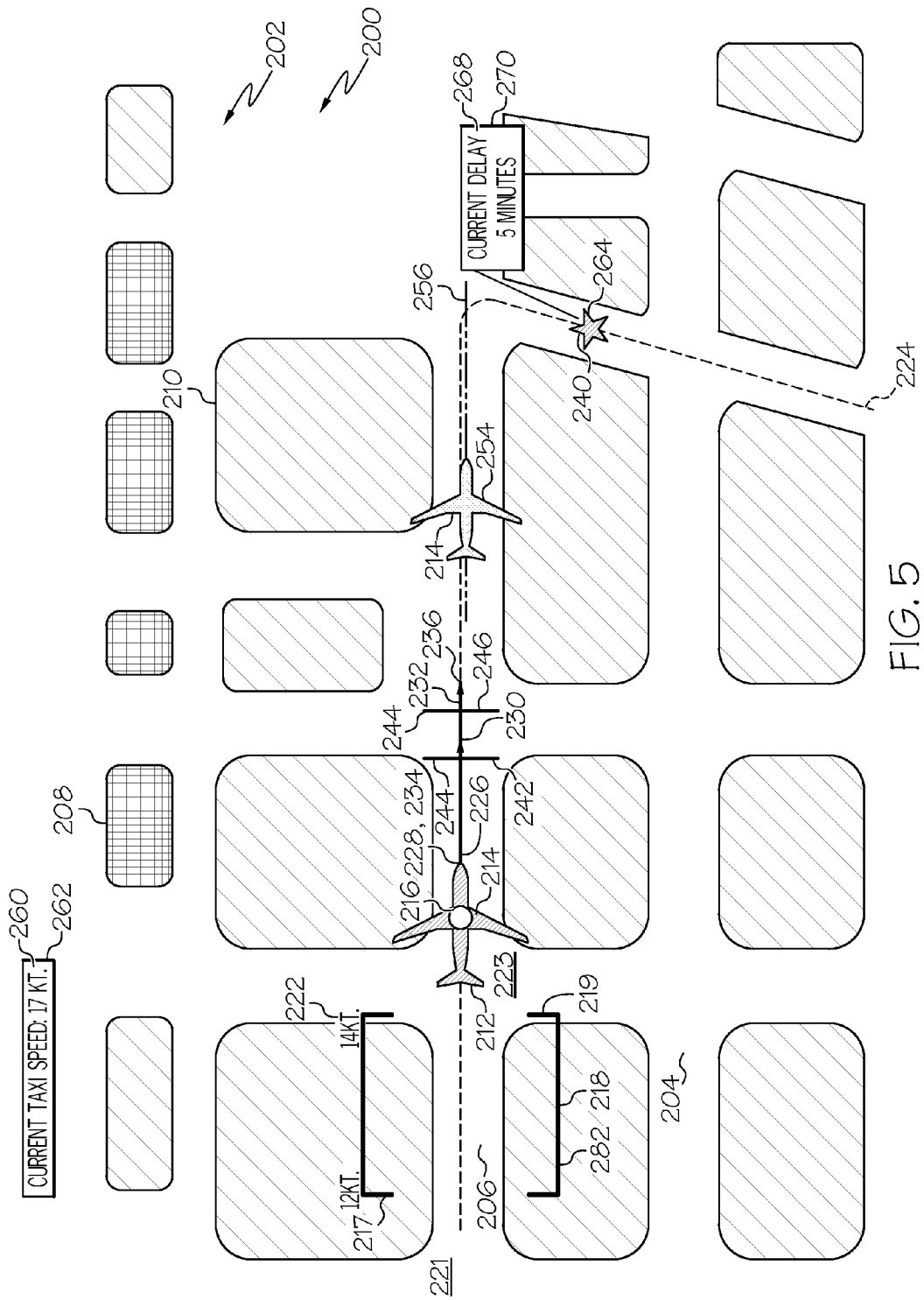
FIG. 5 is a fourth embodiment of the display of operating and position information for an aircraft according to an exemplary embodiment of the present invention.

Referring now to FIG. 5, the display 200 may be a display on the screen 106 of one of the display units 104, 150, 152 when the first aircraft 102 is operating at a speed greater than the optimum speed range, and a danger of collision between the first aircraft 102 and the second aircraft 140 may exist. The display 200 may include the optimum speed range symbol 218 including a thicker still bracket set 284 which may be positioned on the map 202 such that the first aircraft symbol 212 is on the higher bound side. This relative placement of the first aircraft symbol 212 and the optimum speed range symbol 218 may symbolize that the first aircraft 102 is operating at a speed greater than optimum. The distance between the first aircraft symbol 212 and the optimum speed range symbol 218 may correspond to speed difference magnitude between the speed of first aircraft 102 and the optimum speed range.

The thicker still bracket set 284 may include lines of a third thickness, the third thickness greater than the second thickness of the lines of the thicker bracket set 282. The thicker lines may draw a viewer's attention to the display 200 and the viewer may quickly realize that the first aircraft 102 is operating at a speed greater than the optimum speed range, and may be in danger of a collision with the second aircraft 140. In addition to the thicker still bracket set 284, symbols and icons may include colors which may further draw the viewer's attention to the display 200, to the danger of a collision between the first aircraft 102 and the second aircraft 140, and to the operating conditions of the first aircraft 102. Additionally, in this embodiment, the delay point symbol 264 may include the star icon 244.

Figure 6:
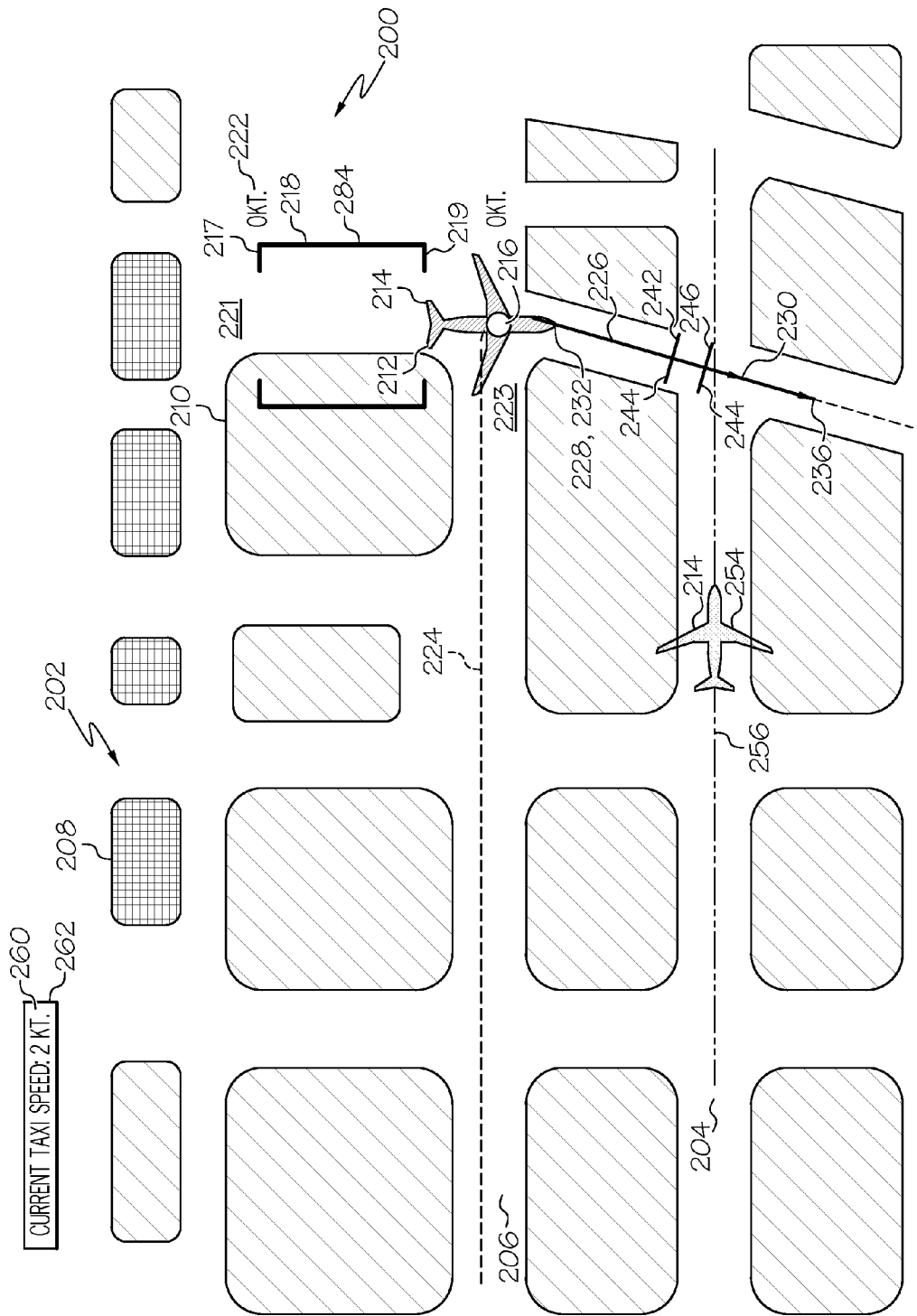
FIG. 6 is a fifth embodiment of the display of operating and position information for an aircraft according to an exemplary embodiment of the present invention.

Referring now to FIG. 6, the display 200 may be another embodiment of a display on the screen 106 of one of the display units 104, 150, 152 when the first aircraft 102 is operating at a speed greater than the optimum speed range, and a danger of collision between the first aircraft 102 and the second aircraft 140 may exist.

Figure 7A:
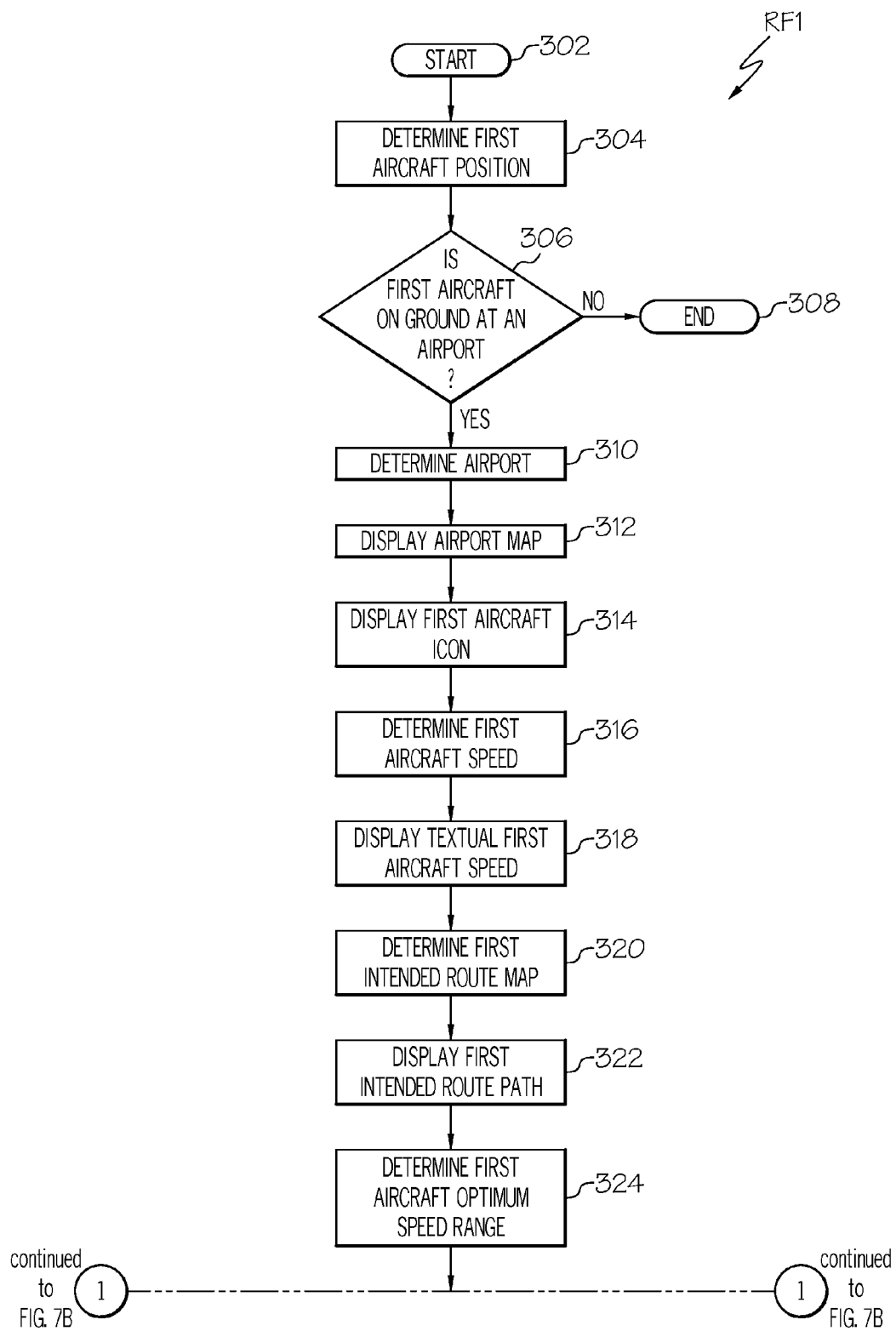
FIG. 7A is a flow chart of a first portion of a method for displaying operating and position information for an aircraft according to an exemplary embodiment of the present invention.

Referring now to FIG. 7A, a flow chart of a first portion of a method 300 for displaying operating and position information for the first aircraft 102 according to an exemplary embodiment of the present invention is illustrated. The method 300 may begin (block 302) and the first controller 112 may determine the position of the first aircraft 102 based on the first aircraft position signal (block 304). Based on the position of the first aircraft 102, the first controller 112 may determine if the first aircraft 102 is on the ground, and at an airport (block 306). If the first aircraft 102 is not on the ground, and at an airport, the method 300 may end (block 308), restart, or move to a time delay and then restart.

If the first aircraft 102 is on the ground, and at an airport, the first controller 112 may determine which airport the first aircraft 102 is located at (block 310), and display on the screen 106 of the first display unit 104, the second display unit 150, and/or the third display unit 152 a map 202 of at least part of the airport, including runways 204 and taxiways 206 (block 312). The first controller 112 may display the map 202 based on the map data 121.

From here on in the description the term "the airport" will refer to the airport where the first aircraft 102 is located; and when an element is displayed on the screen 106, it refers to the screen 106 included in the first display unit 104, the second display unit 150, and/or the third display unit 152. From here on in the description, the terms "the first controller 112 displays" or "the first controller 112 may display" refer to the first controller 112 generating display signals based on which the first display unit 104, the second display unit 150, and/or the third display unit 152 may display an element on the screen 106.

The first controller 112 may display the first aircraft symbol 212 on the map 202 in a first aircraft indicative of the current airport position of the first aircraft 102 (block 314). The first controller 112 may then determine the speed of the first aircraft 102 (block 316). The speed of the first aircraft 102 may be determined based on the first aircraft speed signal. The first controller 112 may display the textual first aircraft speed 260, in the speed text area 262 based on the speed of the first aircraft 102 (block 318).

The first controller 112 may determine the first intended route of the first aircraft 102 (block 320). The first intended route may be determined from information entered in the user interface 134 by the pilot or another crew member after receiving clearance from the air traffic control center 144, or from information received by the receiver 132 from the air traffic control center 144. The first controller may display the first intended route 224 on the map 202 (block 322).

The first controller 112 may determine the optimal speed range for the first aircraft 102 (block 324). The optimal speed range may be determined by the performance model 118. The first controller 112 may display the optimum speed range symbol 218 in an optimum speed range position on the map indicative of a current speed of the first aircraft 102. The first portion of method 300 ends with block 324 in FIG. 7A, but the method 300 continues to be illustrated in FIG. 7B.

Figure 7B:
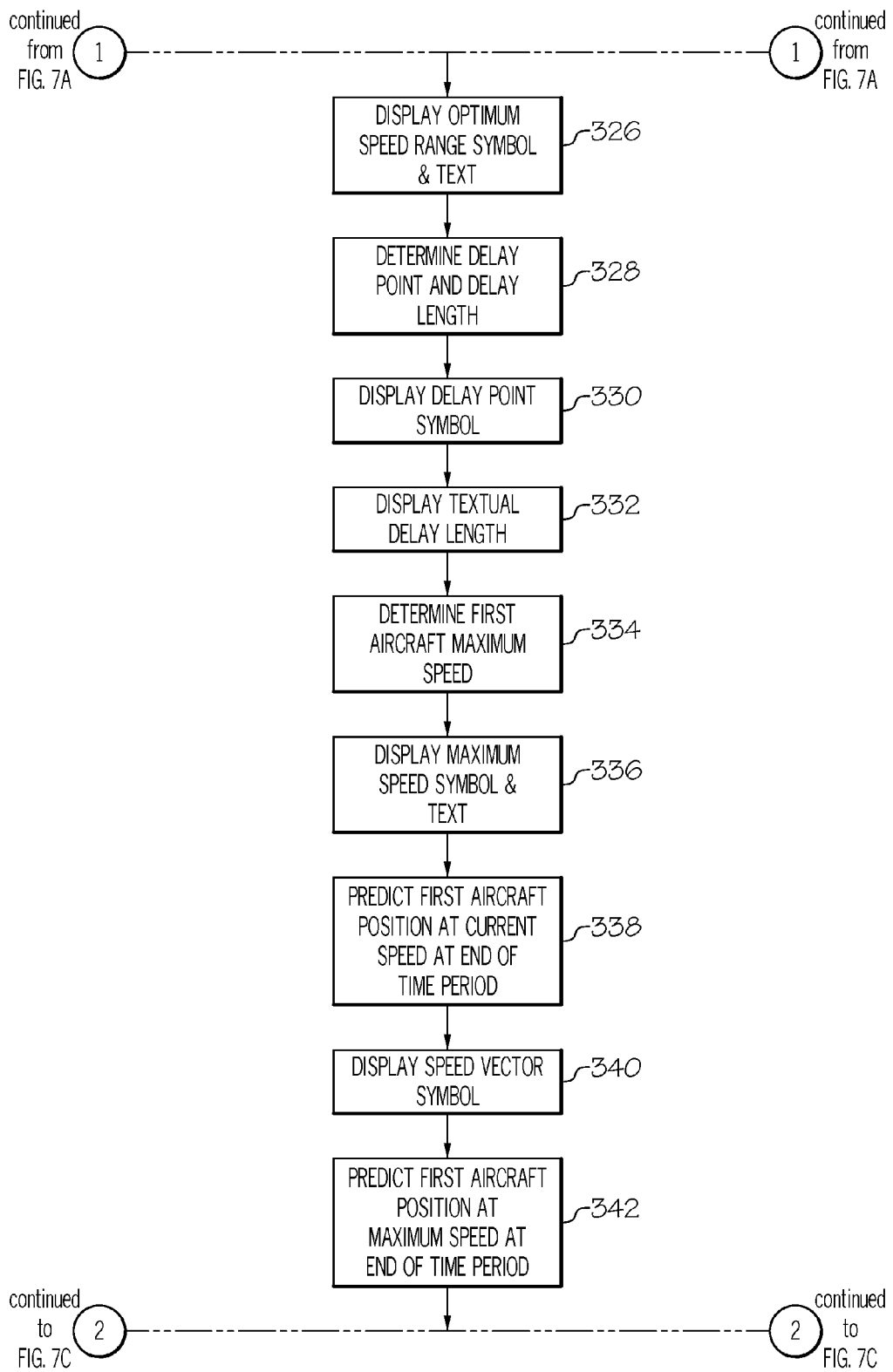
FIG. 7B is a flow chart of a second portion of the method of FIG. 7A according to an exemplary embodiment of the present invention.

Referring now to FIG. 7B, a flow chart of a second portion of the method 300 for displaying operating and position information for the first aircraft 102 according to an exemplary embodiment of the present invention is illustrated. The first controller 112 may display the optimum speed range text based on the determined optimum speed range (block 326). If the first aircraft 102 is operating within the optimum speed range, the optimum speed range symbol 218 may be displayed on the map 202 in a position such that the first aircraft symbol 212 is between the lower bound end 217 and the high bound end 219. If the first aircraft 102 is operating at a speed less than the optimum speed range, the optimum speed range symbol 218 may be displayed on the map 202 in a position such that the first aircraft symbol 212 is on the lower bound side 221. If the first aircraft 102 is operating at a speed greater than the optimum speed range, the optimum speed range symbol 218 may be displayed on the map 202 in a position such that the first aircraft symbol 212 is on the higher bound side 223.

The first controller 112 may determine a delay point at the airport where the first aircraft 102 may be required to stop and wait for clearance, and a wait time which may be a predicted time period the first aircraft 102 may have to wait at the delay point (328). The delay point and wait time may be determined based on information received from the air traffic control center 144. The first controller 112 may display a delay point symbol 264 on the map 202 in a position corresponding to the delay point (block 330), and may display the textual predicted delay time 268, in the delay time text area 270 based on the wait time (block 332).

The first controller 112 may determine the maximum speed the first aircraft 102 may be capable of if the full ETS motive power available is directed to the landing gear assemblies 136 based on a prediction by the performance model 118 (block 334). The first controller 112 may display the maximum speed symbol 248 based on the predicted maximum speed and the current speed of the first aircraft 102 on the map 202, and may display the maximum speed text 252 based on predicted maximum speed (block 336).

The first controller 112 may predict a current speed position of the first aircraft 102 on the first intended route at the end of a predetermined time period, if the first aircraft 102 continues to travel at the current speed (block 338). The time period may, for example be 10 seconds, or may be in a range of 8 second to 12 seconds. The position of the first aircraft 102 may be predicted based on the first aircraft speed signal, the first intended route, and map data 121. The first controller 112 may display the speed vector symbol 226 along the first intended route 224 with the first end 228 at the first aircraft map position and the second end 230 at a position on the map 202 corresponding to the current speed position of the first aircraft 102 (block 340).

The first controller 112 may predict a maximum speed position of the first aircraft 112 on the first intended route at the end of the predetermined time period, if the first aircraft were to travel at the maximum speed possible (block 342). The position of the first aircraft 102 may be predicted based on the maximum speed possible, the first intended route, and map data 121. The second portion of method 300 ends with block 342 in FIG. 7B, but the method 300 continues to be illustrated in FIG. 7C.

Figure 7C:
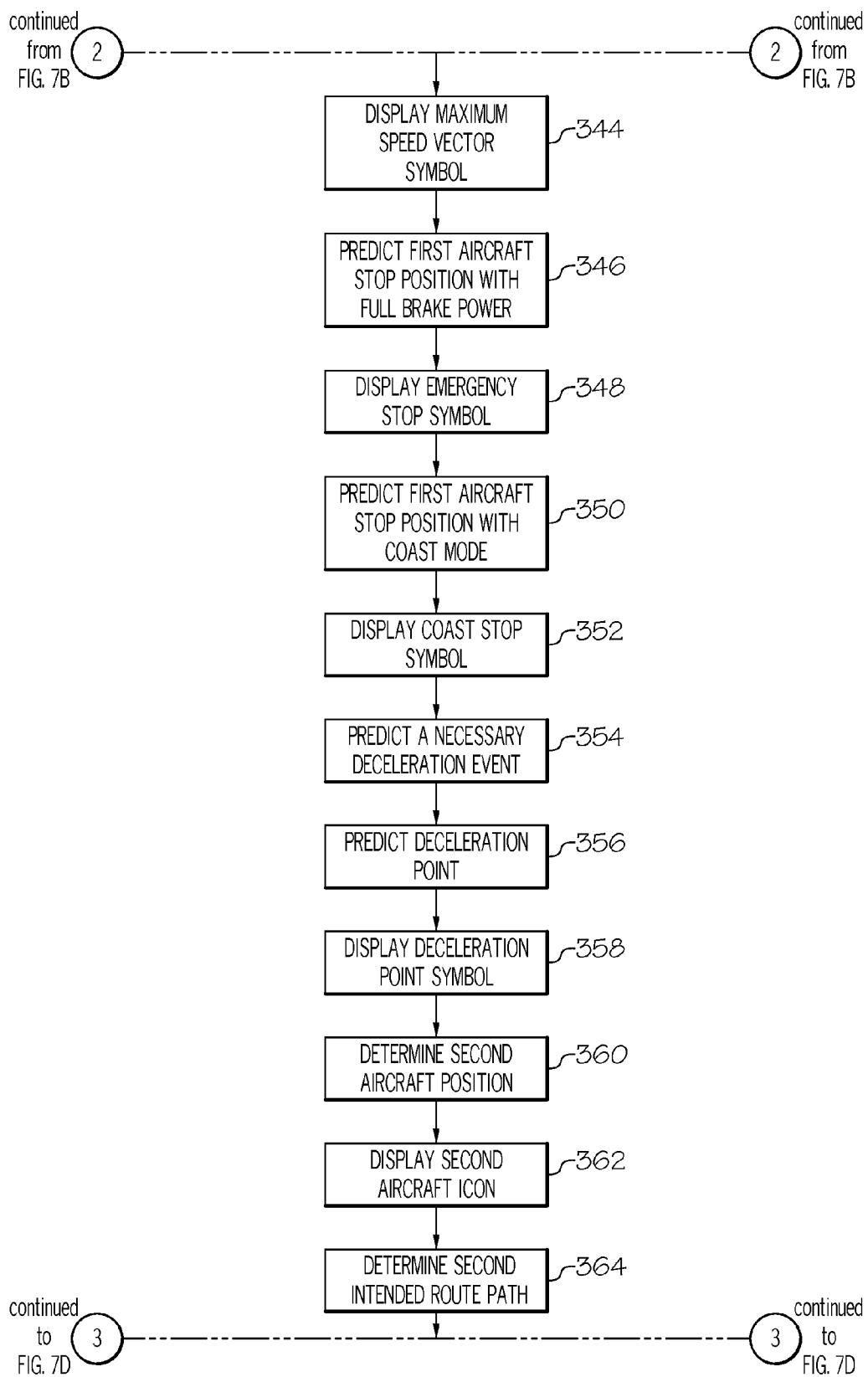
FIG. 7C is a flow chart of a third portion of the method of FIG. 7A according to an exemplary embodiment of the present invention.

Referring now to FIG. 7C, a flow chart of a third portion of the method 300 for displaying operating and position information for the first aircraft 102 according to an exemplary embodiment of the present invention is illustrated. The first controller 112 may display the maximum speed vector symbol 232 along the first intended route 224 with the first end 234 at the first aircraft map position and the second end 236 at a position on the map 202 corresponding to the maximum speed position of the first aircraft 102 (block 344).

The first controller 112 may predict an emergency stop position of the first aircraft 102 on the first intended route. The emergency stop position may be the predicted stop position of the first aircraft 102 if full braking power is applied to the first aircraft 102 until the first aircraft 102 has come to a stop (block 346). The performance model 118 may predict the emergency stop position based on the first aircraft speed signal, the first intended route, and the map data 121. The first controller 112 may display the emergency stop symbol 242 at a position on the map 202 corresponding to the emergency stop position of the first aircraft 102 (block 348).

The first controller 112 may predict a coast stop position of the first aircraft 102 on the first intended route. The coast stop position may be the predicted stop position of the first aircraft 102 if the first aircraft 102 is put in a coast mode until the first aircraft 102 has come to a stop (block 350). The performance model 118 may predict the coast stop position based on the first aircraft speed signal, the first intended route, and the map data 121. The first controller 112 may display the coast stop symbol 246 at a position on the map 202 corresponding to the coast stop position of the first aircraft 102 (block 352).

The first controller 112 may determine a necessary deceleration event (block 354). The necessary deceleration event may be a predicted operation of the first aircraft 102 to continue to follow the first intended route that will necessitate that the first aircraft 102 decelerate. The necessary deceleration event may include, for example, a turn which the first aircraft 102 must make to stay on the first intended route, the turn having a magnitude greater than the first aircraft 102 would be able to make at the current speed. The first controller 112 may also determine a deceleration point (block 356). The deceleration point may be the position along the first intended route that the first aircraft 102 must begin decelerating to accomplish the deceleration event. The first controller 112 may determine the necessary deceleration event and the deceleration point with the performance model 118 based on the first aircraft speed signal, the first intended route, and the map data 121. The first controller 112 may display the deceleration point symbol 238 on the map 202 in the deceleration point position indicative of the position on the first intended route where the first aircraft 102 must begin decelerating to follow the first intended route (block 358).

The first controller 112 may determine the position of the second aircraft 140 based on information received from the second aircraft 140, for example, through the ADS-B system (block 360). The first controller 112 may display the second aircraft symbol 254 on the map 202 in a second aircraft position indicative of the current airport position of the second aircraft 140 (block 362). The first controller 112 may determine the second intended route of the second aircraft 140 (block 364). The second intended route may be determined based on information received from the second aircraft 140, for example, through the ADS-B system. The third portion of method 300 ends with block 364 in FIG. 7C, but the method 300 continues to be illustrated in FIG. 7D.

Figure 7D:
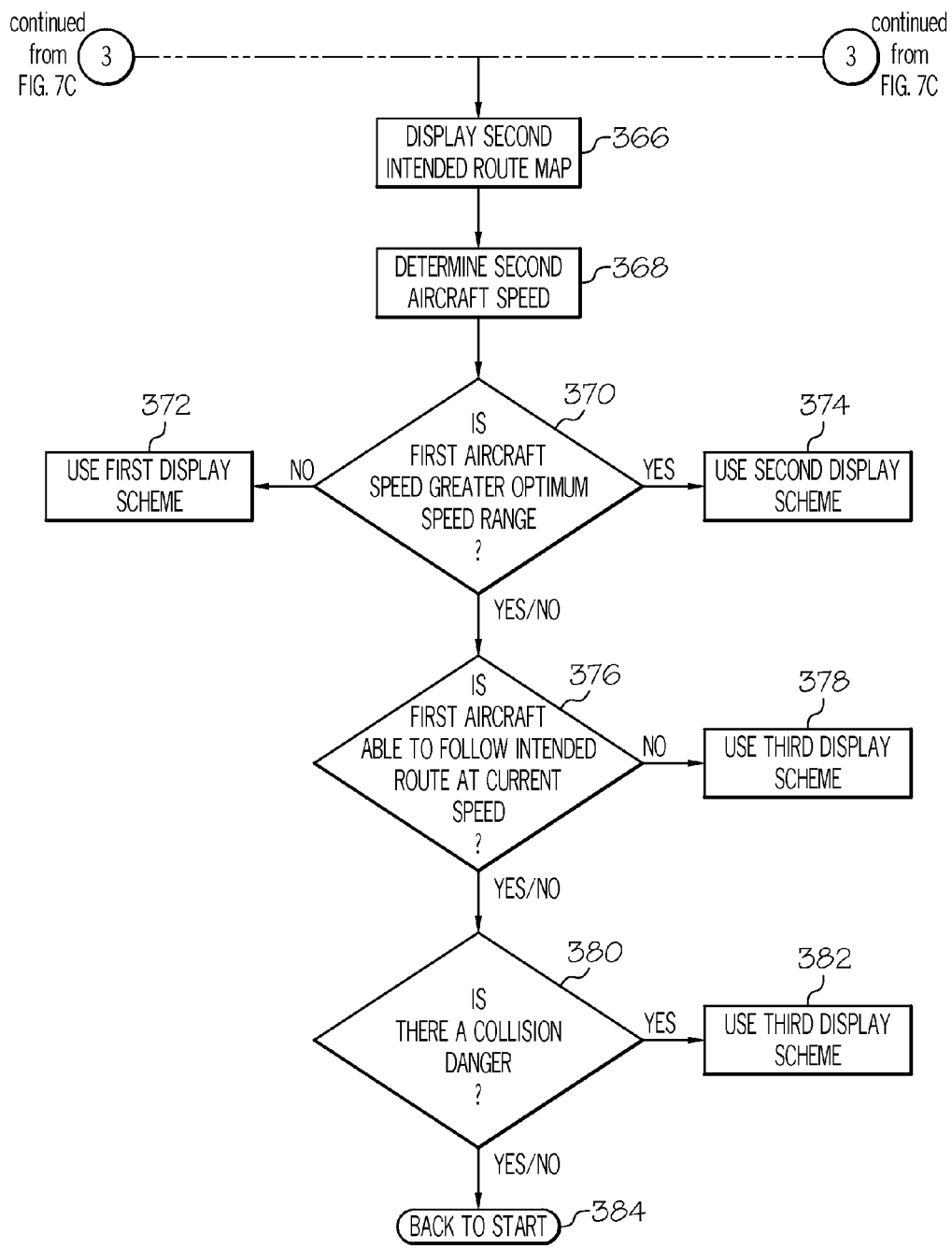
FIG. 7D is a flow chart of a fourth portion of the method of FIG. 7A according to an exemplary embodiment of the present invention.

Referring now to FIG. 7D, a flow chart of a fourth portion of the method 300 for displaying operating and position information for the first aircraft 102 according to an exemplary embodiment of the present invention is illustrated. The first controller 112 may display the second intended route 256 on the map 202 (block 366).

The first controller 112 may then determine the speed of the second aircraft 102 (block 368). The speed of the second aircraft 140 may be determined based on information received from the second aircraft 140, for example, through the ADS-B system.

The first controller 112 may display symbols and icons on the screen 106 in multiple display schemes, the multiple display schemes including a first display scheme, a second display scheme, and a third display scheme. A display scheme may include a scheme of types of icons and symbols, and the way the icons and symbols are displayed in the display 200, and may include the colors and brightness of the map 202, symbols, icons and other elements of the display 200. The first controller 112 may use a particular display scheme when the first aircraft 102 experiences one of multiple predefined sets of operating conditions. Matching different display schemes to predefined sets of operating conditions may allow pilots, other crew members, or others monitoring the first aircraft 102 performance and/or operation to visually recognize that a particular set of operating conditions exist as a result of seeing a particular display scheme.

The first controller 112 may determine whether the first aircraft 102 is operating at a speed greater than the optimum speed range (block 370). If the first aircraft 102 is not operating at a speed greater than the optimum speed range, i.e. operating within or under the optimum speed range, the first controller 112 may use the first display scheme on the screen 106 for the display 200 (block 372). If the first aircraft 102 is operating at a speed greater than the optimum speed range, the first controller 112 may use the second display scheme on the screen 106 for the display 200 (block 374).

The first controller 112 may determine whether the first aircraft 102 is able to follow the first intended route at the current speed (block 376). If the first aircraft 102 is not able to follow the first intended route at the current speed, the first controller 112 may use the third display scheme on the screen 106 for the display 200 (block 378).

The first controller 112 may determine whether there is a danger of a collision between the first aircraft 102 and the second aircraft 140; or the first aircraft 102 and buildings or other obstacles at the airport (block 380). The first controller 112 may determine if there is a danger of a collision between the first aircraft 102 and the second aircraft 140 based on the first aircraft position, the first aircraft speed, the first intended route, the second aircraft position, the second aircraft speed, and the second intended route. The first controller 112 may determine if there is a danger of a collision between the first aircraft 102 and the buildings or other obstacle at the airport based on the first aircraft position, the first aircraft speed, the first intended route, the geometry of the first aircraft 102, and map data 121. If there is a danger of a collision between the first aircraft 102 and the second aircraft 140 or the buildings or other obstacles at the airport, the first controller 112 may use the third display scheme on the screen 106 for the display 200 (block 378).

The method 300 may end after this (block 384), start again, or start again after a time delay.

It should be understood, of course, that the foregoing relates to exemplary embodiments of the invention and that modifications may be made without departing from the spirit and scope of the invention as set forth in the following claims.

We claim:

1. A method of displaying aircraft operating and position information with an electronic display unit, comprising:
    determining a position of a first aircraft at an airport; determining a ground optimum speed range of the first aircraft, with a performance model;
    determining a first aircraft ground speed of the first aircraft with a speed sensor;
    generating display signals as a function of the first aircraft position, the first aircraft ground optimum speed, and the first aircraft ground speed;
    displaying on a screen of the display unit a map of the airport, including geographic locations and dimensions of runways and taxiways, from map data in an airport database;
    displaying a first aircraft symbol on the map, the first aircraft symbol displayed in a position on the map indicative of position of the first aircraft; and
    displaying an optimum speed range symbol, the optimum speed range symbol having a lower bound end and a higher bound end, on the map; and
    wherein the optimum speed range symbol is displayed in a position on the map such that the first aircraft symbol is between the lower bound end and the higher bound end when the first aircraft speed is within the optimum speed range.

2. The method of claim 1, wherein the optimum speed range symbol is placed in a position on the map such that the first aircraft symbol is on a lower bound side of the optimum speed range symbol when the first aircraft speed is less than the optimum speed range; and the optimum speed range symbol is placed in a position on the map such that the first aircraft symbol is on a higher bound side of the optimum speed range symbol when the first aircraft speed is greater than the optimum speed range.

3. The method of claim 1, further comprising displaying a first intended route on the map indicative of a first intended route of the first aircraft.

4. The method of claim 3, further comprising;

displaying a speed vector symbol along the first intended route, the speed vector symbol having a first end and a second end, the speed vector displayed with the first end at the first aircraft map position and the second end at a current speed predicted position on the map, the current speed predicted position indicative of a predicted position of the first aircraft if the first aircraft maintains the current speed of the first aircraft for a first time period; and displaying a maximum speed vector symbol along the current intended route, the maximum speed vector symbol having a first end and a second end, the maximum speed vector displayed with the first end at the first aircraft map position and the second end at a maximum speed predicted position on the map, the maximum speed predicted position indicative of a predicted position of the first aircraft if the first aircraft maintains the maximum possible speed of the first aircraft for a first time period.

5. The method of claim 3, further comprising; displaying a deceleration point symbol on the map in a deceleration point position indicative of a position on the first intended route where the first aircraft must begin decelerating to follow the first intended route.

6. The method of claim 3, further comprising;

displaying an emergency stop symbol on the map in an emergency stop position on the first intended route indicative of a stop position of the first aircraft if full braking power is applied to the first aircraft until the first aircraft has come to a stop; and displaying a coast stop symbol on the map in a coast stop position on the first intended route indicative of a stop position of the first aircraft if the first aircraft is put in a coast mode until the first aircraft has come to a stop.

7. The method of claim 1, further comprising;

displaying the map, the first aircraft symbol, and the optimum speed range symbol in a first display scheme when the current speed of the first aircraft is within or less than the optimum speed range;

displaying the map, the first aircraft symbol, and the optimum speed range symbol in a second display scheme when the current speed of the first aircraft is greater than the optimum speed range, the second display scheme different than the first display scheme; and displaying the map, the first aircraft symbol, and the optimum speed range symbol in a third display scheme when the current speed of the first aircraft is greater than a speed necessary for the first aircraft to follow a first intended route, the third display scheme different than the first display scheme and the second display scheme.

8. The method of claim 1, further comprising;

determining a second aircraft position of a second aircraft; and displaying a second aircraft symbol on the map, the second aircraft symbol displayed in a position on the map indicative of the second aircraft position.

9. The method of claim 8, further comprising; displaying a second intended route on the map indicative of an intended route of the second aircraft.

10. The method of claim 8, further comprising; displaying the map, the first aircraft symbol, and the optimum speed range symbol in a third display scheme when there is a danger of collision between the first aircraft and the second aircraft.

11. An aircraft operating and position information display system, comprising:

an aircraft speed sensor configured to generate a first aircraft ground speed signal indicative of the speed of a first aircraft;

a GPS system configured to generate a first aircraft position signal indicative of a geographic position of the first aircraft at an airport;

a controller including an aircraft performance model configured to predict a ground optimum speed range for the first aircraft; and an airport database including map data of the airport, the map data including geographic locations and dimensions of runways and taxiways, and wherein the controller is configured to generate display signals as a function of the first aircraft ground speed signal, the first aircraft position signal, the ground optimum speed range, and the map data; and a first display unit configured to display as a function of the display signals;

a map of at least part of the airport, including runways and taxiways, from map data in an airport database;

a first aircraft symbol on the map, the first aircraft symbol displayed in a position on the map indicative of position of the first aircraft; and an optimum speed range symbol, the optimum speed range symbol having a lower bound end and a higher bound end, on the map; and wherein the optimum speed range symbol is displayed in a position on the map such that the first aircraft symbol is between the lower bound end and the higher bound end when the first aircraft speed is within the optimum speed range.

12. The system of claim 11, wherein the first display unit is located in the flight deck of the first aircraft.

13. The system of claim 11, further comprising a receiver configured to receive a second aircraft position signal from a second aircraft at the airport; and wherein the controller is configured to generate the display signals as a function of the first aircraft speed signal, the first aircraft position signal, the optimum taxi speed range, the map data, and the second aircraft position signal; and wherein the display unit is configured to display a second aircraft symbol on the map in a position on the map indicative of a position of the second aircraft as a function of the display signals.

14. The system of claim 11, further comprising at least one first aircraft operating parameter sensor configured to generate an operating parameter signal indicative of an operating parameter of the first aircraft; and wherein the aircraft performance model is configured to predict the optimum speed range as a function of the operating parameter signal.

15. The system of claim 11, wherein the optimum speed range is a speed range in which the first aircraft will achieve at least one of optimal fuel efficiency, minimal wear of brakes on an electric taxi system, or minimal wear of an auxiliary power unit powering the electric taxi system.

16. The system of claim 11, further comprising a receiver configured to receive a first intended route signal from an air traffic controller tower indicative of an approved first intended route of the first aircraft; and
    wherein the controller is configured to generate the display signals as a function of the first aircraft speed signal, the first aircraft position signal, the optimum taxi speed range, the map data, and the first intended route signals; and
    wherein the display unit is configured to display a first intended route on the map indicative of the approved first intended route of the first aircraft as a function of the display signals.

17. The system of claim 11, wherein the aircraft speed sensor, the GPS system, the controller, and the first display unit are located onboard the first aircraft; and
    further comprising;
    a) a transmitter configured to transmit the display signals located onboard the first aircraft;
    b) a second display unit located remotely from the first aircraft and configured to receive the display signals and display as a function of the display signals;
        a map of at least part of the airport, including runways and taxiways, from map data in an airport database;
        a first aircraft symbol on the map, the first aircraft symbol displayed in a position on the map indicative of position of the first aircraft; and
        an optimum speed range symbol, the optimum speed range symbol having a lower bound end and a higher bound end, on the map; and
    wherein the optimum speed range symbol is displayed in a position on the map such that the first aircraft symbol is between the lower bound end and the higher bound end when the first aircraft speed is within the optimum speed range.

18. The system of claim 11, further comprising; a receiver onboard the first aircraft configured to receive second aircraft signals from a second aircraft at the airport including a second aircraft position signal indicative of the position of the second aircraft, a second aircraft speed signal indicative of the speed of the second aircraft, and a second intended route signal indicative of an intended route of the second aircraft; and configured to receive a first intended route signal from an air traffic controller tower indicative of an approved first intended route of the first aircraft; and
    wherein the controller is configured to predict an impending collision as a function of the first aircraft speed signal, the first aircraft position signal, the first intended route signal, the second aircraft speed signal, the second aircraft position signal, the second intended route signal, and map data; and
    wherein the aircraft performance model is configured to predict the optimum speed range for the first aircraft as a function of a controller predicted impending collision.

19. A display unit, comprising a screen in a flight deck of a first aircraft configured to:
    receive display signals including a first aircraft position signal indicative of a position of the first aircraft at an airport, a first aircraft ground speed signal indicative of a ground speed of the first aircraft, airport map data including geographic locations and dimensions of runways and taxiways for the airport, and a ground optimum speed range signal indicative of a ground optimum speed range of the first aircraft; and
    display on the screen, as a function of the display signals, a map of the airport, including geographic positions and dimensions of runways and taxiways, from map data in an airport database; a first aircraft symbol on the map, the first aircraft symbol displayed in a position on the map indicative of position of the first aircraft; and an optimum speed range symbol, the optimum speed range symbol having a lower bound end and a higher bound end, on the map; and
    wherein the optimum speed range symbol is displayed in a position on the map such that the first aircraft symbol is between the lower bound end and the higher bound end when the first aircraft speed is within the optimum speed range.

20. The display unit of claim 19, further configured to display a textual first aircraft speed, in a speed text area, as a function of the display signals.

\* \* \* \* \*